April 25, 1961
D. L. BROWN
2,981,513
TUBE SUPPORTING CLIP
Filed May 2, 1958
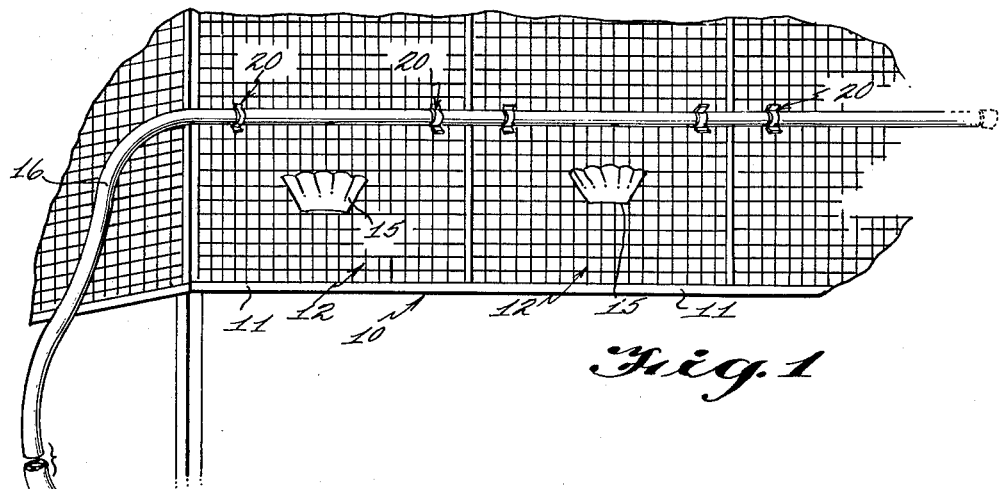
Fig. 1
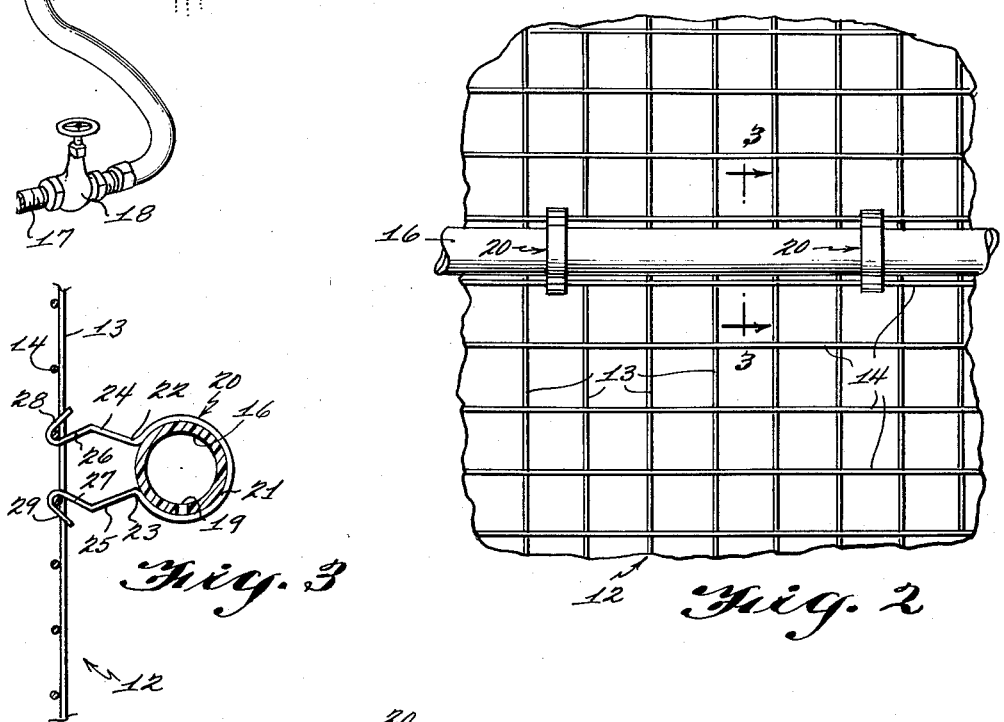
Fig. 3
Fig. 2
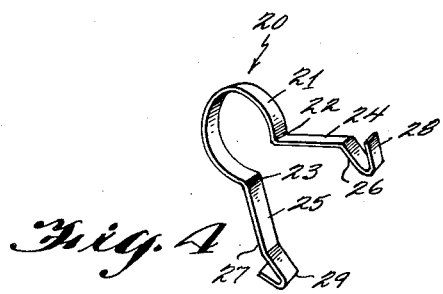
Fig. 4
INVENTOR.
DWIGHT L. BROWN
BY
Kimmel & Crowell
ATTORNEYS

United States Patent Office 2,981,513
Patented Apr. 25, 1961

2,981,513

TUBE SUPPORTING CLIP

Dwight L. Brown, 3457 Riverside Drive, Beloit, Wis.

Filed May 2, 1958, Ser. No. 732,659

1 Claim. (Cl. 248—73)

The present invention relates to tube supporting clips of the type used in animal watering systems which are attached to the cages in which the animals are raised.

The primary object of the invention is to provide a tube supporting clip for supporting a tube in outwardly spaced relation from a cage to form part of a watering system for animals wherein a plurality of animal watering dishes are simultaneously filled from a single pipe.

Another object of the invention is to provide in a clip of the class described above a pipe support structure supporting the watering pipe in spaced relation to the cage.

Another object of the invention is to provide a clip of the above type which makes possible an animal watering system which is inexpensive to manufacture, easy to install, and by means of which the time required for watering the animals can be materially reduced.

Other objects and advantages will become apparent in the following specification when considered in the light of the attached drawings, in which:

Figure 1 is a fragmentary perspective view of the invention shown attached to a cage.

Figure 2 is an enlarged fragmentary front elevation of the invention.

Figure 3 is an enlarged fragmentary vertical cross-section taken along the line 3—3 of Figure 2, looking in the direction of the arrows.

Figure 4 is a perspective view of the invention removed from the pipe and cage.

Referring now to the drawings in detail wherein like reference numerals indicate like parts throughout the several figures, the reference numeral 10 indicates generally an animal watering system which incorporates the invention.

The animal watering system 10 is used in conjunction with a plurality of animal cages 11 having welded wire mesh panels generally indicated at 12 closing the front thereof. The welded wire meshes 12 include a plurality of vertical wires 13 having a plurality of perpendicularly extending horizontal wires 14 welded thereto.

Conventional watering dishes 15 are secured to the wire mesh panels 12 in a conventional manner. A pipe 16 formed of plastic hose or other suitable material extends horizontally across the front of the cages 11 and is connected through a pipe 17 to a water source (not shown) through a hand operated valve 18. The hose 16 is perforated at 19 through the bottom thereof overlying the watering dishes 15 so that water flowing through the hose 16 will flow through the perforation 19 and fill each of the watering dishes 15.

The invention consists primarily of a metallic clip generally indicated at 20 which is provided for supporting the hose 16 at spaced parallel points on the front of the cages 11. The clip 20 is provided with a semi-cylindrical band 21 terminating at 22 and 23 in closely adjacent but spaced apart points and having integral outwardly diverging extensions 24, 25 integrally formed thereon. The extensions 24, 25 are provided, respectively, with outwardly converging end portions 26, 27 terminating in reverted hook members 28, 29 integrally formed thereon.

The semi-cylindrical band 21 of the clip 20 is pressed onto the hose 16 and extends thereabout. The hook members 28, 29 are pressed together and inserted between a pair of horizontal wires 14 and then released with the wire 14 engaging the bight between the respective hook members and converging portions 26, 27, as best shown in Figure 3.

The clip 20 is semi-resilient and securely holds the hose 16 in outwardly spaced relation with respect to the panel 12 where it is secured firmly against dislodgment. The clip 20 can be easily attached and detached to permit the hose 16 to be replaced, repaired, or changed as the condition requires.

In the watering of small fur bearing animals, such as mink, the use of plastic hoses where the hose was fastened directly to the cage mesh, was found impractical since the animals would gnaw between the wires of the mesh panel to create holes in the plastic hose to the extent that the hose become unusable.

With the present clip 20, the hose 16 is supported a sufficient distance outwardly of the mesh panel 12 so that the animal in the cage 11 can not gnaw the hose 16 or in any way damage it from within the cage.

It should be understood that the clip 20 can also be used to support tubes formed of copper, steel and aluminum as well as plastic from other structures than cages, such as woven or welded wire fence.

The clip 20, while shown as a flat member curved to the desired shape, may also be formed of wire of any desired cross section and any desired material including spring steel.

Having thus described the preferred embodiment of the invention, it should be understood that numerous structural modifications and adaptations may be resorted to without departing from the scope of the appended claim.

What is claimed is:

A semi-resilient tube supporting clip for use in a water system of the type attached to the exterior of animal cages having wire mesh panels including vertically and horizontally extending wires and an elongated tube having perforations formed therein for filling animal watering dishes positioned therebelow, said clip comprising a substantially cylindrical tube encompassing band having a pair of spaced opposing ends, outwardly diverging extension members integrally formed on said opposing ends of said band, inwardly converging outwardly reverted hook members formed integrally on the outer end of each of said extension members, said extension members being compressible whereby said hooks may be brought towards each other for insertion of said hook members through said wire mesh to engage each of said hooks against a respective one of said vertical wires of said mesh.

References Cited in the file of this patent

UNITED STATES PATENTS

| 501,439 | Reznor | July 11, 1893 |
| 2,141,032 | Cordell | Dec. 20, 1938 |
| 2,541,908 | Attwood | Feb. 13, 1951 |